(12) United States Patent
Kim et al.

(10) Patent No.: US 9,553,790 B2
(45) Date of Patent: Jan. 24, 2017

(54) TERMINAL APPARATUS AND METHOD OF CONTROLLING TERMINAL APPARATUS

(71) Applicants: Samsung Electronics Co., Ltd, Suwon-si, Gyeonggi-do (KR); Industry-Academic Cooperation Foundation, Yonsei University, Seoul (KR)

(72) Inventors: Jaehong Kim, Suwon-si (KR); Seok-hwan Kong, Yongin-si (KR); Jae-yong Lee, Seoul (KR); Honguk Woo, Seoul (KR); Sungwon Han, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 232 days.

(21) Appl. No.: 14/453,682

(22) Filed: Aug. 7, 2014

(65) Prior Publication Data

US 2015/0043592 A1 Feb. 12, 2015

(30) Foreign Application Priority Data

Aug. 8, 2013 (KR) .......................... 10-2013-0094355

(51) Int. Cl.
*H04L 29/06* (2006.01)
*H04L 12/701* (2013.01)
(Continued)

(52) U.S. Cl.
CPC ............... *H04L 45/00* (2013.01); *H04L 47/27* (2013.01); *H04L 45/50* (2013.01)

(58) Field of Classification Search
CPC ....................................................... H04L 45/00
See application file for complete search history.

(56) References Cited

U.S. PATENT DOCUMENTS

| | | | | |
|---|---|---|---|---|
| 5,924,116 | A * | 7/1999 | Aggarwal ......... | G06F 17/30902 707/E17.12 |
| 6,745,243 | B2 * | 6/2004 | Squire ............... | H04L 29/12009 709/227 |

(Continued)

FOREIGN PATENT DOCUMENTS

| | | |
|---|---|---|
| JP | 2012-244592 | 12/2012 |
| KR | 10-2011-0080272 | 7/2011 |
| WO | 2012-110109 | 8/2012 |

OTHER PUBLICATIONS

Van Jacobson et al., Networking Named Content, ACM, Oct. 13, 2009, pp. 1-12, Palo Alto Research Center, USA.

(Continued)

*Primary Examiner* — Parth Patel
(74) *Attorney, Agent, or Firm* — Staas & Halsey LLP

(57) ABSTRACT

A terminal apparatus included in a contents centric network and a communication method thereof are provided, the communication method including receiving an interest packet regarding a specific content from an external terminal apparatus, adjusting a window size of the interest packet based on at least one of a requesting frequency of the specific content corresponding to the interest packet and a communication status, and after adjusting the window size, transmitting the interest packet to surrounding terminal apparatuses.

20 Claims, 9 Drawing Sheets

(51) Int. Cl.
*H04L 12/807* (2013.01)
*H04L 12/723* (2013.01)

(56) References Cited

U.S. PATENT DOCUMENTS

| | | | | |
|---|---|---|---|---|
| 7,400,627 | B2* | 7/2008 | Wu | H04L 12/5601 370/392 |
| 7,574,538 | B1* | 8/2009 | Yochai | G06F 3/0613 710/36 |
| 7,738,461 | B2* | 6/2010 | Nakamura | H03M 13/09 370/241 |
| 8,160,069 | B2 | 4/2012 | Jacobson et al. | |
| 8,428,555 | B2* | 4/2013 | Kim | H04L 65/80 370/338 |
| 8,937,865 | B1* | 1/2015 | Kumar | H04L 47/125 370/235 |
| 2003/0084214 | A1* | 5/2003 | Dunlap | G06F 13/385 710/52 |
| 2010/0046393 | A1* | 2/2010 | Knapp | H04L 41/0609 370/253 |
| 2010/0195655 | A1* | 8/2010 | Jacobson | H04L 45/748 370/392 |
| 2010/0205213 | A1* | 8/2010 | Broder | G06F 17/30457 707/780 |
| 2011/0213888 | A1* | 9/2011 | Goldman | H04L 63/1458 709/228 |
| 2011/0271007 | A1* | 11/2011 | Wang | H04L 45/306 709/238 |
| 2011/0310864 | A1* | 12/2011 | Gage | H04L 45/02 370/338 |
| 2012/0297088 | A1* | 11/2012 | Wang | H04L 63/0272 709/238 |
| 2013/0018937 | A1* | 1/2013 | Kim | G06F 17/30902 709/202 |
| 2013/0029664 | A1* | 1/2013 | Lee | H04L 67/32 455/435.1 |
| 2013/0060962 | A1* | 3/2013 | Wang | H04L 67/327 709/238 |
| 2013/0163610 | A1* | 6/2013 | Ko | H04L 67/327 370/428 |
| 2013/0198351 | A1* | 8/2013 | Widjaja | H04L 67/2842 709/223 |
| 2014/0089454 | A1* | 3/2014 | Jeon | H04L 67/2852 709/213 |
| 2014/0143446 | A1* | 5/2014 | Jacobson | H04L 67/1095 709/248 |
| 2014/0164552 | A1* | 6/2014 | Kim | H04L 67/2842 709/214 |
| 2014/0233575 | A1* | 8/2014 | Xie | H04L 45/44 370/400 |
| 2015/0006683 | A1* | 1/2015 | Panje | H04N 21/4305 709/219 |
| 2015/0039784 | A1* | 2/2015 | Westphal | H04L 45/306 709/240 |
| 2015/0040180 | A1* | 2/2015 | Jacobson | G06F 21/62 726/1 |
| 2015/0146737 | A1* | 5/2015 | Muscariello | H04L 47/19 370/400 |
| 2015/0304380 | A1* | 10/2015 | Muramoto | H04N 21/2187 709/219 |
| 2015/0312373 | A1* | 10/2015 | Muramoto | H04L 47/283 370/238 |
| 2015/0365495 | A1* | 12/2015 | Fan | H04L 12/6418 709/213 |

OTHER PUBLICATIONS

Satoru Okamoto et al., Energy Efficient and Enhanced-type Data-centric Network, Graduate School of Science and Technology, Keiko University, Yokohama, Japan.

* cited by examiner

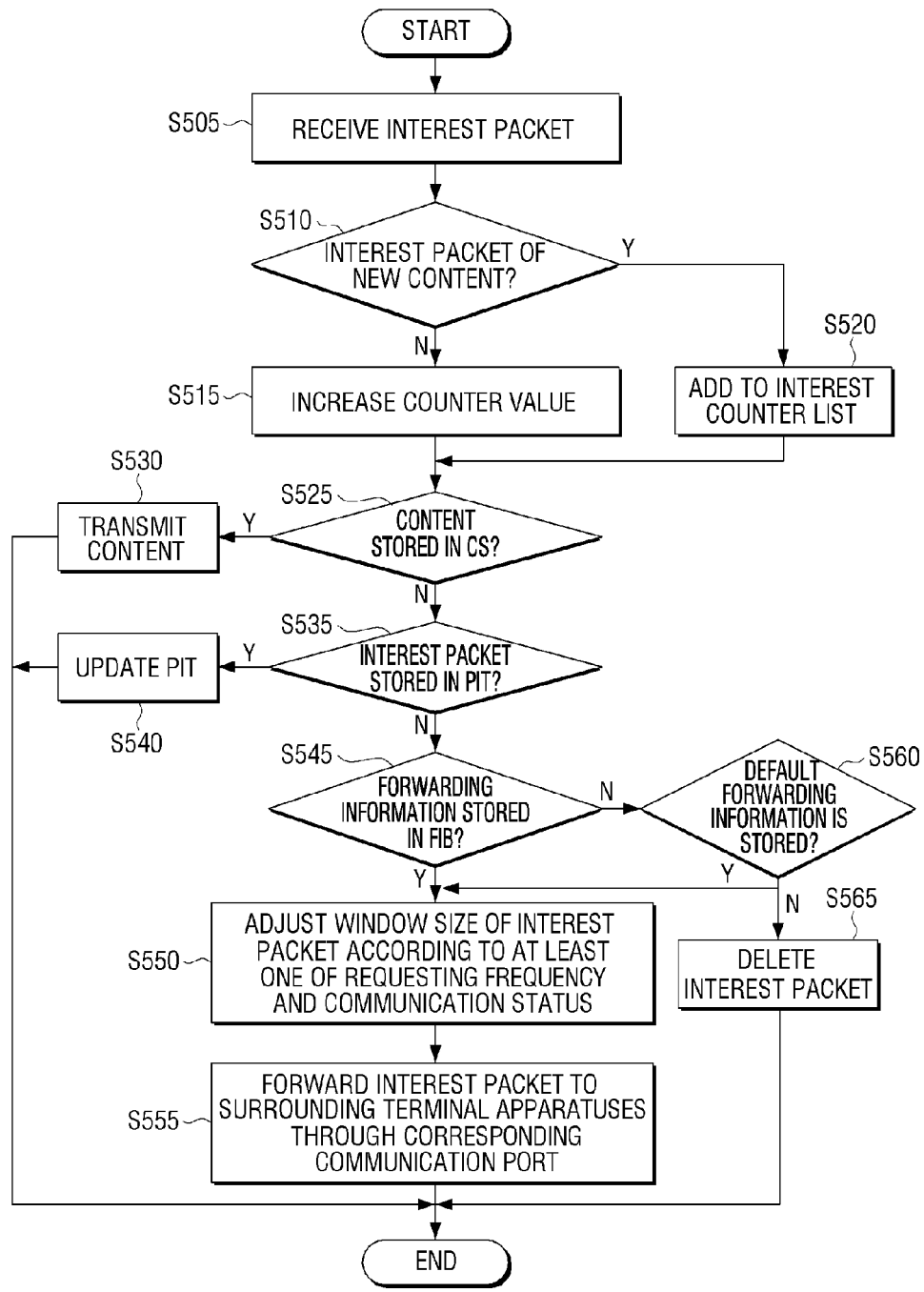

TERMINAL APPARATUS AND METHOD OF CONTROLLING TERMINAL APPARATUS

CROSS-REFERENCE TO RELATED APPLICATIONS

This application claims priority under 35 U.S.C. §119 from Korean Patent Application No. 10-2013-0094355, filed on Aug. 8, 2013 in the Korean Intellectual Property Office, the disclosure of which is incorporated herein by reference in its entirety.

BACKGROUND OF THE INVENTION

1. Field of the Invention

Devices and methods consistent with what is disclosed herein relate to a terminal apparatus and a method of controlling the terminal apparatus, and more specifically, to a terminal apparatus configured to forward a received interest packet to surrounding terminal apparatuses based on a priority order of contents, and a method of communicating with the terminal apparatus.

2. Description of the Related Art

A contents centric network (CCN) is a wireless network which performs routing by using identifiers of contents differently from a conventional wireless network which performs communication by using IP addresses. Herein, each node of a CCN (referred to hereafter as a "CCN node") includes a contents store (referred to hereafter as "CS"), a pending interest table (referred to hereafter as "PIT"), and a forwarding information base (referred to hereafter as "FIB"), and performs transmitting contents data by using the above stored data.

By referring to FIG. 1, the following will explain in detail the concept of transmitting contents including contents corresponding to a CCN node that transmits an interest packet, which is a message requesting specific contents, by using the CS, PIT and FIB.

First, the FIB is a unit which manages a routing path of the interest packet.

In CCN illustrated in FIG. 1 view (a), when specific contents are registered on a server of CCN, the server broadcasts a message including an identifier of contents that are newly registered. The broadcasted message is received toward CCN node A near to the server, and CCN node A matches an identifier of a communication port receiving the message with the identifier of contents included in the message, stores the matched data in its own FIB, and broadcasts the message through every communication port. The operations of storing information and transmitting a message by using the FIB are uniformly performed in every CCN node included in the CCN, and thus, every CCN node matches and stores the identifier of contents registered and an identifier of a communication port receiving the message on its own FIB.

For convenient explanation, the following assumes that a content A is registered on the server, and every CCN node matches and stores an identifier of content A and an identifier of a communication port corresponding to content A in its FIB through the above described processes. When client 1 is trying to receive content A, client 1 generates an interest packet including the identifier of content A and transmits the interest packet to CCN node H, which corresponds to the CCN node nearest to client 1. When CCN node H confirms that there are no contents having the same identifier as that of content A among the stored contents in its own CS, it matches and stores the identifier of content A with a path where the interest packet is received (i.e., an identifier of a communication port receiving the interest packet) in its PIT. Further, CCN node H confirms the FIB, selects a communication port which will transmit the corresponding interest packet (i.e., select the communication port matched and stored with the identifier of content A included in the interest packet within the FIB), outputs the interest packet through the selected communication port, and deletes information regarding the identifier of content A and the identifier of the communication port which are matched and stored together within the FIB. The outputted interest packet is received at CCN node D. Similar operations are uniformly performed at CCN node D, CCN node B, and CCN node A, as illustrated in FIG. 1 view (b), and thus, the interest packet is finally delivered to the server.

The server confirms that specific CCN node A requests content A through the interest packet and transmits content A to CCN node A, which was the CCN node to finally transmit the interest packet. CCN node A, receiving content A, confirms that content A is not presently stored in its own CS, and stores content A in the CS of CCN node A. Further, CCN node A confirms whether the identifier of content A is stored in the PIT or not. Already described, because the identifier of content A and the identifier of the communication port receiving the interest packet including content A are matched and stored in the PIT of CCN node A, CCN node A selects the communication port which will transmit content A through the PIT (the communication port matched and stored with content A), and transmits content A through the selected communication port. Similar operations are uniformly performed at CCN node B, CCN node D, and CCN node H, as illustrated in FIG. 1 view (c), and thus, content A is stored at CCN node A, CCN node B, CCN node D, and CCN node H, as illustrated in FIG. 1 view (d). Client 1 finally receives content A from CCN node H.

After the above operations are completed, when client 2 is trying to receive content A, client 2 also transmits the interest packet including the identifier of content A to CCN node D through CCN node I, as illustrated in FIG. 1 view (e).

CCN node D has previously stored content A in its own CS, through the above-described processes. Thus, CCN node D confirms that its CS stores the contents having the same identifier as that of the requested contents (content A) included in the interest packet, transmits content A to CCN node I transmitting the interest packet through the communication port connected with CCN node I, as illustrated in FIG. 1 view (f), and CCN node I transmits content A to client 2 after storing content A in its own CS. Therefore, client 2 may receive contents more efficiently because contents may be transmitted from the surrounding CCN nodes, not the server.

With the above described CCN, a user may be provided with requested contents through a nearby CCN node storing the contents, regardless of the initial position of the contents' owner. Therefore, the load of the server initially distributing contents may be reduced, thereby reducing amount of network use by shortening average transmission paths, and enhancing the speed of receiving desired contents at a user. Further, receiving contents can be performed more quickly and stably because contents can be requested and received through multiple paths.

The purpose of CCN is to transmit popular contents having a high requesting frequency more efficiently and stably. However, a method of requesting contents by considering priority order such as a requesting frequency of contents is not specifically known.

SUMMARY OF THE INVENTION

Exemplary embodiments of the present general inventive concept provide a terminal apparatus which performs transmitting of an interest packet more efficiently by adjusting a window size of the interest packet according to a requesting frequency of contents or a communication status, and a communication method thereof.

Additional features and utilities of the present general inventive concept will be set forth in part in the description which follows and, in part, will be obvious from the description, or may be learned by practice of the general inventive concept.

Exemplary embodiments of the present general inventive concept provide a communication method of a terminal apparatus included in a contents centric network (CCN), the method including receiving an interest packet regarding a specific content from an external terminal apparatus, adjusting a window size of the interest packet based on at least one of a requesting frequency of the specific content corresponding to the interest packet and a communication status, and after adjusting the window size, transmitting the interest packet to surrounding terminal apparatuses.

Receiving the interest packet may include determining whether the specific content corresponding to the interest packet has been previously requested or not, and adding the specific content to a request counter list when the specific content corresponding to the interest packet has not been previously requested, and increasing a counter value of the specific content included in the request counter list by a predetermined ratio when the specific content corresponding to the interest packet has been previously requested.

Adjusting the window size may include determining the requesting frequency of the specific content based on at least one of a counter value included in the request counter list and a number of communication ports receiving the interest packet regarding the specific content stored in a pending interest table.

Adjusting the window size may include determining the communication status by receiving information from an external network monitor regarding a bandwidth of a communication port to transmit the interest packet.

Adjusting the window size may include increasing the window size to forward the interest packet as the requesting frequency of the specific content corresponding to the interest packet increases.

The communication method may further include, when the requesting frequency of the specific content corresponding to the interest packet is more than a preset value, requesting at least one or more segments consecutively requested after a segment of the content corresponding to the interest packet.

The terminal apparatus may include a contents store to store contents, a pending interest table to store information of a communication port requested for the contents, and a forwarding information base to store information regarding a communication port to forward the interest packet, and the communication method may further include determining whether the specific content is stored in the contents store or not, when the interest packet regarding the specific content is received, and transmitting the specific content stored in the contents store to the external terminal apparatus, when the specific content is stored in the contents store.

The communication method may further include determining whether a request for the specific content is stored in the pending interest table or not, when the specific content is not stored in the contents store, and updating a communication port regarding the specific content stored in the pending interest table, when the request for the specific content is stored in the pending interest table.

The communication method may further include, when the request for the specific content is not stored in the pending interest table, determining whether forwarding information regarding the specific content is stored in the forwarding information base in order to forward the interest packet. Transmitting the interest packet may include transmitting the interest packet based on the forwarding information when forwarding information of the specific content is stored in the forwarding information base, and transmitting the interest packet based on the default forwarding information when forwarding information of the specific content is not stored in the forwarding information base.

Exemplary embodiments of the present general inventive concept also provide a terminal apparatus included in a contents centric network, the terminal apparatus including a communicator to perform communication with an external device, and a controller to control the communicator to adjust a window size of an interest packet regarding a specific content based on at least one of a requesting frequency of the specific content corresponding to the interest packet and a communication status when the interest packet is received from an external terminal apparatus through the communicator, and to control the communicator to transmit the interest packet to surrounding terminal apparatuses after adjusting the window size.

The terminal apparatus may further include a storage unit configured to store a request counter list. The controller may control the storage unit to determine whether the specific content corresponding to the interest packet has been previously requested or not when the interest packet is received, to add the specific content to the request counter list when the specific content corresponding to the interest packet has not been previously requested, and to increase a counter value of the specific content included in the request counter list by a predetermined ratio when the specific content corresponding to the interest packet has not been previously requested.

The controller may determine the requesting frequency of the specific content based on at least one of a counter value included in the request counter list and a number of communication ports receiving the interest packet regarding the specific content of a pending interest table stored in the storage unit.

The controller may determine the communication status by receiving information from an external network monitory regarding a bandwidth of a communication port to transmit the interest packet.

The controller may increase the window size to forward the interest packet as the requesting frequency of the specific content corresponding to the interest packet increases.

The controller may control the communicator to request at least one or more segments consecutively requested after a segment of the content corresponding to the interest packet, when the requesting frequency of the specific content corresponding to the interest packet is more than a preset value.

The terminal apparatus may additionally include a storage unit to store contents, a pending interest table to store information of a communication port requested for contents, and a forwarding information base to store information regarding a communication port to forward the interest packet. When the interest packet regarding the specific content is received, the controller may control the communicator to determine whether the specific content is stored in the contents store, and transmit the specific content stored in the contents store to the external terminal apparatus, when the specific content is stored in the contents store.

When the specific content is not stored in the contents store, the controller may determine whether a request for the specific content is stored in the pending interest table, and update a communication port regarding the specific content stored in the pending interest table, when the request for the specific content is stored in the pending interest table.

The controller may control the communicator to determine whether forwarding information regarding the specific content is stored in the forwarding information base in order to forward the interest packet, when the request for the specific content is not stored in the pending interest table, to transmit the interest packet based on the forwarding information when forwarding information regarding the specific content is stored in the forwarding information base, and to transmit the interest packet based on the default forwarding information when forwarding information regarding the specific content is not stored in the forwarding information base.

A non-transitory computer-readable recording medium may contain computer-readable codes as a program to execute a communication method described above or hereinafter.

Exemplary embodiments of the present general inventive concept also provide a contents centric network (CCN), including a plurality of terminal apparatuses, each terminal apparatus including a communicator to perform communication with an external device, a storage unit to store a requesting frequency of a specific content, and a controller to increment the requesting frequency when an interest packet regarding the specific content is received at the communicator, to control the communicator to adjust a window size of an interest packet based on at least one of the requesting frequency of the interest packet and a communication status of the CCN, and to control the communicator to transmit the interest packet to surrounding terminal apparatuses in the CCN after adjusting the window size.

The CCN may further include a plurality of servers corresponding to the plurality of terminal apparatuses, the plurality of servers forming a controlling plane of a GMPLS network.

The CCN may further include a path establisher to receive network situation information from the plurality of servers, and to establish one or more data transmission paths between the plurality of servers to transmit the interest packet, the paths being established based on the network situation information.

The network situation information may include available bandwidth regarding a plurality of communication links within the GMPLS network.

Exemplary embodiments of the present general inventive concept also provide a communication method of a terminal apparatus in a contents centric network (CCN), the method including receiving at the terminal apparatus an interest packet regarding a specific content, incrementing a requesting frequency of the specific content, adjusting a window size of the interest packet based on at least one of the requesting frequency and a communication status of the CCN, and after adjusting the window size, transmitting the interest packet to terminal apparatuses surrounding the first terminal apparatus in the CCN.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a flowchart illustrating a communication method of the terminal apparatus in detail according to an exemplary embodiment of the present general inventive concept;

DETAILED DESCRIPTION OF THE EMBODIMENTS

Figure 1:
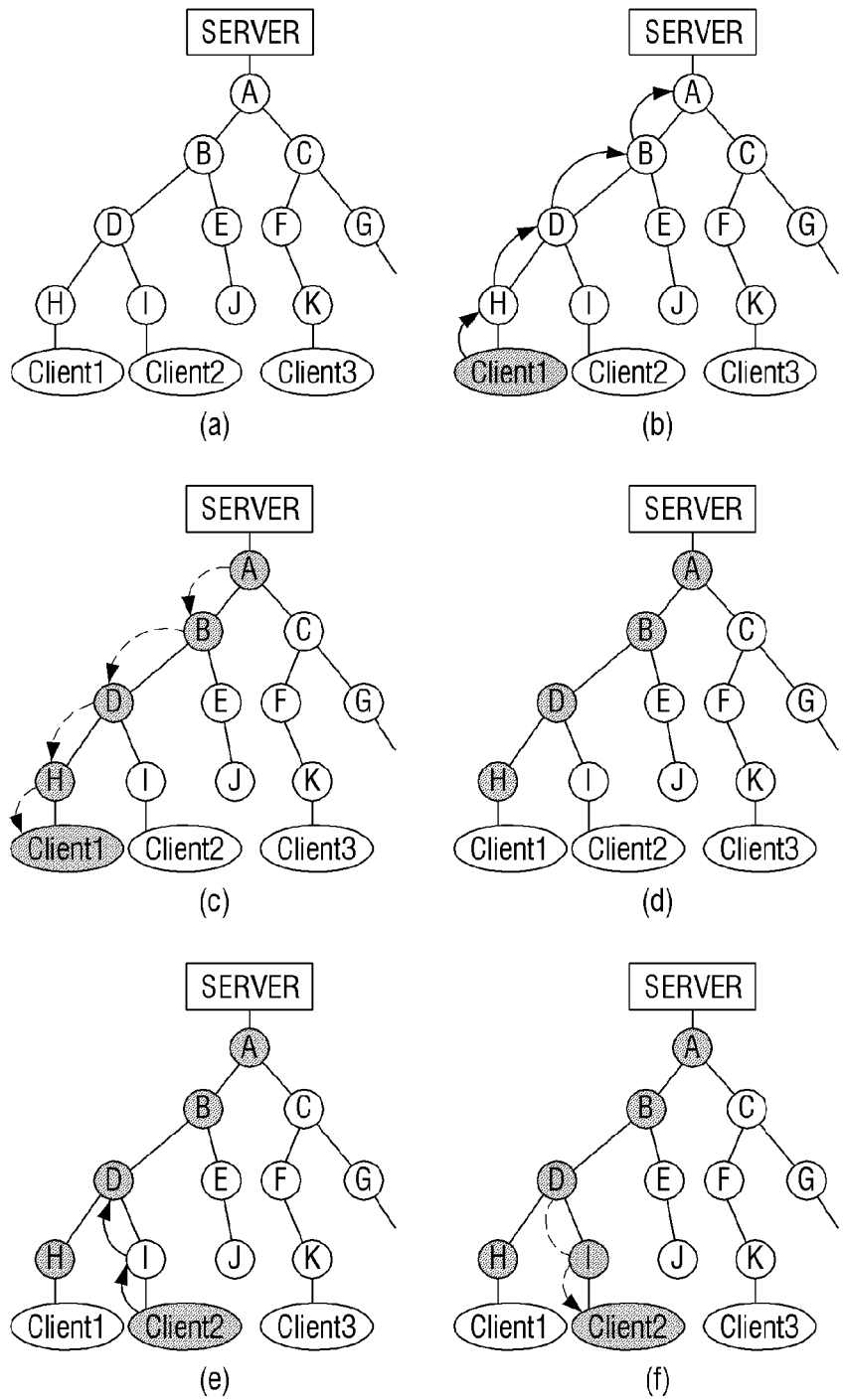
FIG. 1 is a diagram illustrating a contents centric network (CCN)

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same drawing reference numerals are used for the same elements even in different drawings. The matters defined in the description, such as detailed construction and elements, are provided to assist in a comprehensive understanding of the present general inventive concept. Accordingly, it is apparent that the exemplary embodiments of the present general inventive concept can be carried out without those specifically defined matters. Also, well-known functions or constructions are not described in detail since they would obscure the invention with unnecessary detail.

Figure 2:
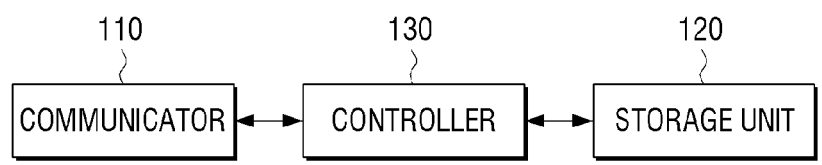
FIG. 2 is a schematic block diagram of a terminal apparatus which is a node of a CCN according to an exemplary embodiment of the present general inventive concept.

Referring to the attached drawings, exemplary embodiments of the present general inventive concept will be described in detail below. FIG. 2 is a schematic block diagram of a terminal apparatus 100 which is a node of a contents centric network (CCN) according to an exemplary embodiment of the present general inventive concept. Referring to FIG. 2, the terminal apparatus 100 includes a communicator 110, a storage unit 120, and a controller 130. Herein, the terminal apparatus 100 may be implemented to be various electronic apparatuses such as for example a smart phone, a tablet PC, a notebook PC, a desktop PC, and an image forming device such as a printer or a scanner.

Meanwhile, FIG. 2 comprehensively illustrates a plurality of units by exemplifying a case that the terminal apparatus 100 is provided with various functions such as a communicating function and a contents storing function. Thus, according to exemplary embodiments of the present general inventive concept, some units illustrated in FIG. 2 may be deleted or modified, and other new units may be added.

The communicator 110 performs communication with external devices. Specifically, the communicator 110 may transmit or receive contents data or an interest packet to request contents data with external terminal apparatuses included in the CCN. In this process, the interest packet is a message packet to request contents.

Further, the communicator 110 includes a plurality of communication ports 111, 112, etc. (illustrated in FIG. 3), and may perform communication with external terminal apparatuses (not illustrated) through corresponding communication ports to the external terminal apparatuses. For example, when the communication port corresponding to a first external terminal apparatus is a first communication port 111, the communicator 110 may perform communication with the first external terminal apparatus through the first communication port 111.

The storage unit 120 stores various data and programs to perform functions of the terminal apparatus 100. Specifically, the storage unit 120 stores a contents store (CS) 122 (illustrated in FIG. 3) to store contents, a pending interest table (PIT) 123 (illustrated in FIG. 3) to store information of a communication port requested for contents, and a forwarding information base (FIB) 124 (illustrated in FIG. 3) to store information regarding a communication port to forward the interest packet.

Herein, the CS 122 may store contents names, data, and life time so as to confirm the stored contents. Further, the PIT 123 stores information regarding a communication port in which the interest packet is received and information indicating that the corresponding interest file is interchanged so as to transmit data or a packet. Thus, the PIT 123 may include information related with routing to provide contents to a terminal apparatus 100. Further, when corresponding contents are not stored, the FIB 124 may store information regarding to which place the interest packet is forwarded. Thus, corresponding contents names and their communication ports are matched and stored in FIB 124.

Further, the storage unit 120 may store a request counter list 121 (illustrated in FIG. 3) to store requesting frequency information regarding specific content and an interest shaper 125 (illustrated in FIG. 3) to save window size information regarding the interest packet of specific content.

"Window size," as related to data transfer and the exemplary embodiments of the present general inventive concept described herein, is a measure of how many bytes of data may be transmitted at one time. As a window size increases, more data may be transmitted at one time, and so a given interest packet may be transmitted more quickly with an increased window size. Conversely, as the window size decreases, less data may be transmitted at one time, and so a given interest packet is transmitted more slowly.

The controller 130 controls general operation of the terminal apparatus 100. Specifically, when the interest packet of specific content is received from an external terminal apparatus through the communicator 110, the controller 130 controls the communicator 110 to adjust a window size to forward the interest packet according to at least one from among a requesting frequency of the specific content corresponding to the interest packet and a communication status, and transmit the interest packet of the adjusted window size to surrounding external terminal apparatuses.

The controller 130 may also control one or more functional units (not illustrated) of the terminal apparatus 100. As noted above, the terminal apparatus 100 may be implemented as various electronic apparatuses such as for example a smart phone, a tablet PC, a notebook PC, a desktop PC, and an image forming device such as a printer or a scanner. A functional unit of such a terminal apparatus 100 may perform a corresponding function of the terminal apparatus 100. For example, if the terminal apparatus 100 is implemented as a device including a display unit (not illustrated) to display images, a functional unit of the terminal apparatus 100 may be the display unit.

The methods described hereinafter or before may be displayed on a display unit of the terminal apparatus 100. For example, a statement according to the method, such as an operation or a result of an operation, may be displayed on the display unit.

Figure 3:
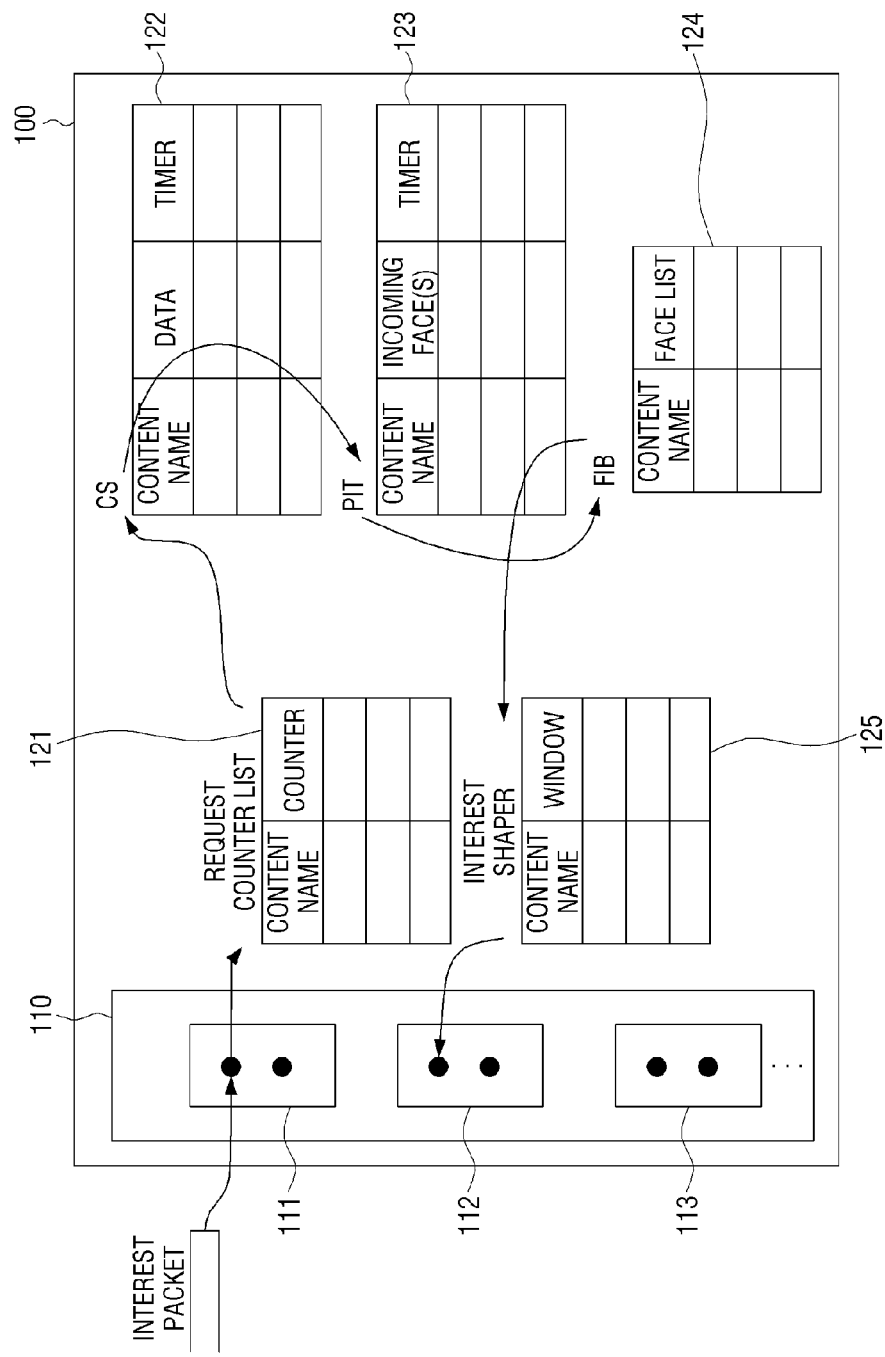
FIG. 3 is a diagram illustrating a process in which the terminal apparatus processes an interest packet according to an exemplary embodiment of the present general inventive concept.

The following will explain a method in which the controller 130 adjusts the window size of the interest packet according to at least one from among the requesting frequency of the specific content corresponding to the interest packet and the communication status, and transmits to surrounding terminal apparatuses, by referring to FIG. 3.

First, when the interest packet regarding specific content is received from an external terminal apparatus through the first communication port 111, the controller 130 determines whether the specific content corresponding to the interest packet has been previously requested or not. When the specific content corresponding to the interest packet has not been previously requested, the controller 130 adds the specific content to the request counter list 121. Further, the controller 130 may establish a counter value of the specific content to be 1. When the specific content corresponding to the interest packet has been previously requested, the controller 130 may control the storage unit 120 to increase a counter value of the specific content included in the request counter list 121 by a certain ratio (e.g., 1).

Further, the controller 130 determines whether corresponding contents to the received interest packet is stored in the CS 122. When a specific content is stored in the CS 122, the controller 130 controls the communicator 110 to transmit the specific content stored in the CS 122 to an external terminal apparatus through the first communication port 111. Thus, the controller 130 may control the communicator 110 to directly transmit the stored content to an external terminal apparatus requesting the content without forwarding the received interest packet to surrounding terminal apparatuses.

When the specific content is not stored in CS 122, the controller 130 may determine whether the requested specific content is stored in the PIT 123 or not. Thus, in order to determine whether a request of the specific content has been previously performed, the controller 130 may determine whether the specific content is stored in PIT 123.

When the requested specific content is stored in the PIT 123, the controller 130 may update a communication port regarding the specific content stored in the PIT 123. For example, when the communication port previously requesting content A (described above with reference to FIG. 1) is a third communication port 113, PIT 123 matches and stores content A with the third communication port 113 requesting content A. Thereafter, when content A is requested through the first communication port 111, the controller 130 may update the first communication port 111 to be stored with the third communication port 113 as requesting content A. As part of this process, the interest packet is deleted.

However, when the requested specific content is not stored in the PIT 123, the controller 130 may determine whether forwarding information regarding the requested specific content (e.g., information of a communication port to forward the interest packet) is stored in the FIB 124, in order to forward the interest packet.

When forwarding information of the specific content is stored in the FIB 124, the controller 130 may determine a communication port to transmit the interest packet. For example, when the communication port to forward the interest packet regarding content A is a second communication port 112, the controller 130 may determine forwarding information of content A to be the second communication port 112.

However, when forwarding information of the requested specific content is not stored in the FIB 124, the controller 130 determines whether default forwarding information is stored in the storage unit 120 or not. When default forwarding information is stored, the controller 130 uses the default forwarding information as forwarding information to transmit the interest packet. For example, when it the default is that the interest packet regarding content A is forwarded through the second communication port 112, the controller 130 may determine forwarding information regarding content A to be the second communication port 112.

However, when default forwarding information is not stored, the controller 130 deletes the interest packet.

After forwarding information (i.e., information regarding a communication port in which the interest packet is forwarded) is determined, the controller 130 confirms the requesting frequency regarding the specific content and the communication status, determines the window size of the interest packet, and stores this information in the interest shaper 125.

Specifically, the controller 130 may determine the requesting frequency of specific content based on at least one of a counter value included in the request counter list 121 and the number of communication ports in which the interest packet of the specific content stored in the PIT 123 is received. Further, the controller 130 may determine the communication status by receiving information regarding bandwidth of a communication port to transmit the interest packet from an external network monitor. In addition, the controller 130 may increase the window size of the interest packet to be forwarded as the requesting frequency becomes higher or the communication status becomes faster. Conversely, the controller 130 may decrease the window size of the interest packet to be forwarded as the requesting frequency becomes lower or the communication status becomes slower.

Further, the controller 130 may control the communicator 110 to transmit the interest packet whose window size is adjusted to surrounding terminal apparatuses through the determined communication port. For example, the controller 130 may control the communicator 110 to transmit the interest packet of content A to surrounding terminal apparatuses through the second communication port 112.

By using the terminal apparatus 100 described above, a user transmits the interest packet according to popularity or priority order of contents, and thus, providing contents service can be more made more efficient.

Further, when some contents have higher requesting frequencies, a probability that contents are stored near to a given user is higher. By increasing the window size of the interest packet regarding corresponding contents, traffics that frequently occur in a local area can be efficiently processed. Use of limited network bandwidth instead of the entire network is improved as compared to the conventional situation, and thus, the possibility of obtaining the necessary bandwidth to transmit normal contents taken from a long distance becomes higher as compared to the conventional situation.

Further, according to an exemplary embodiment of the present general inventive concept, when popular contents are requested, i.e., when the requesting frequency of the specific content corresponding to the interest packet is greater than a preset value, the controller 130 may control the communicator 110 to request at least one or more segments which are consecutively requested after a segment of content corresponding to the interest packet.

Specifically, when the interest packet regarding a first segment of contents is transmitted from a plurality of external terminal apparatuses, only one interest packet regarding the first segment is transmitted conventionally. However, according to an exemplary embodiment of the present general inventive concept, when the interest packet regarding the first segment of contents is received by more than a preset value, the controller 130 may previously expect and request to surrounding terminal apparatuses a second segment that can be consecutively requested after the first segment, as well as request the first segment.

Thereby, a user may be provided with more efficient service because popular contents are received faster.

Figure 4:
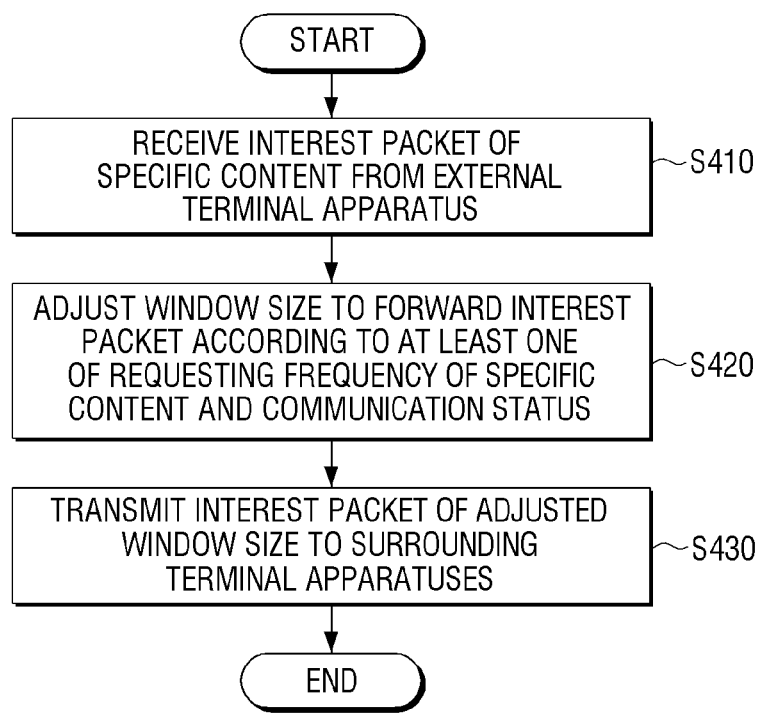
FIG. 4 is a flowchart illustrating a communication method of the terminal apparatus according to an exemplary embodiment of the present general inventive concept.

FIG. 4 is a flowchart illustrating a communication method of the terminal apparatus 100 according to an exemplary embodiment of the present general inventive concept.

First, the terminal apparatus 100 receives the interest packet regarding specific content from an external terminal apparatus at operation S410. At this process, the terminal apparatus 100 may increase a counter value of the interest packet regarding the specific content.

At operation S420, the terminal apparatus 100 adjusts window size in which the interest packet is forwarded according to at least one from among requesting frequency of the specific content corresponding to the interest packet and communication status. Specifically, the terminal apparatus 100 may determine the requesting frequency of the specific content based on at least one from among a counter value included in the request counter list 121 and the number of communication ports in which the interest packet of specific content stored in the PIT 123 is received. Further, the terminal apparatus 100 may determine the communication status by receiving information from an external network monitor regarding bandwidth of a communication port to transmit the interest packet. The terminal apparatus 100 may increase the window size of the interest packet to be forwarded as the requesting frequency becomes higher or the communication status becomes faster, and decrease the window size of the interest packet to be forwarded as the requesting frequency becomes lower or the communication status becomes slower.

At operation S430, the terminal apparatus 100 transmits the interest packet of the adjusted window size to surrounding terminal apparatuses. Specifically, the terminal apparatus 100 may transmit the interest packet whose window size is adjusted to surrounding terminal apparatuses through the communication port corresponding to the specific content.

FIG. 5 is a flowchart illustrating a communication method of the terminal apparatus 100 in detail according to an exemplary embodiment of the present general inventive concept.

At operation S505, the terminal apparatus 100 receives the interest packet regarding specific content from an external terminal apparatus.

The terminal apparatus 100 determines whether the received interest packet is an interest packet regarding new contents or not at operation S510.

When the interest packet is determined to be an interest packet of new contents at operation S510-Y, the terminal apparatus 100 adds the specific content to the interest counter list at operation S520. However, when the interest packet is not determined to be an interest packet of new contents at operation S510-N, i.e., when the interest packet has been previously received, the terminal apparatus 100 increases a counter value of the specific content included in the interest counter list at operation S515.

At operation S525, the terminal apparatus 100 determines whether the specific content is stored in the CS 122 or not.

When the specific content is stored in the CS 122 at operation S525-Y, the terminal apparatus 100 transmits the specific content stored in the CS 122 to an external terminal apparatus at operation S530.

However, when the specific content is not stored in the CS 122 at operation S525-N, the terminal apparatus 100 determines whether the interest packet of the specific content is stored in the PIT 123 or not at operation S535.

When the interest packet of specific content is stored in the PIT 123 at operation S535-Y, the terminal apparatus 100 updates the PIT 123 at operation S540. Thus, the terminal apparatus 100 updates information regarding the corresponding communication port 111, 112, etc. to the specific content stored in the PIT 123.

However, when the interest packet of the specific content is not stored in the PIT 123 at operation S535-N, the terminal apparatus 100 determines whether forwarding information regarding the specific content is stored in the FIB 124 or not at operation S545.

When forwarding information of the specific content is stored in the FIB 124 at operation S545-Y, the terminal apparatus 100 adjusts the window size of the interest packet according to at least one of the requesting frequency of the specific content and the communication status at operation S550. Further, the terminal apparatus 100 forwards the interest packet to surrounding terminal apparatuses through the communication port corresponding to the interest packet at operation S555.

However, when forwarding information regarding the specific content is not stored in the FIB 124 at operation S545-N, the terminal apparatus 100 determines whether the default forwarding information is stored or not at operation S560. When the default forwarding information is stored at operation S560-Y, the terminal apparatus 100 adjusts the window size of the interest packet according to at least one from among the requesting frequency of the specific content and the communication status at operation S550, and forwards the interest packet to surrounding terminal apparatuses through the default communication port at operation S555. When the default forwarding information is not stored at operation S560-N, the terminal apparatus 100 deletes the interest packet at operation S565.

As described above, the user terminal apparatus 100 transmits the interest packet according to the requesting frequency of contents or the communication status. Thus, providing contents service to a user can be more efficient.

The following will explain a method in which a CCN node 610 automatically updates the FIB 124 according to an embodiment of the present general inventive concept by referring to FIGS. 6A to 8.

Figure 6A:
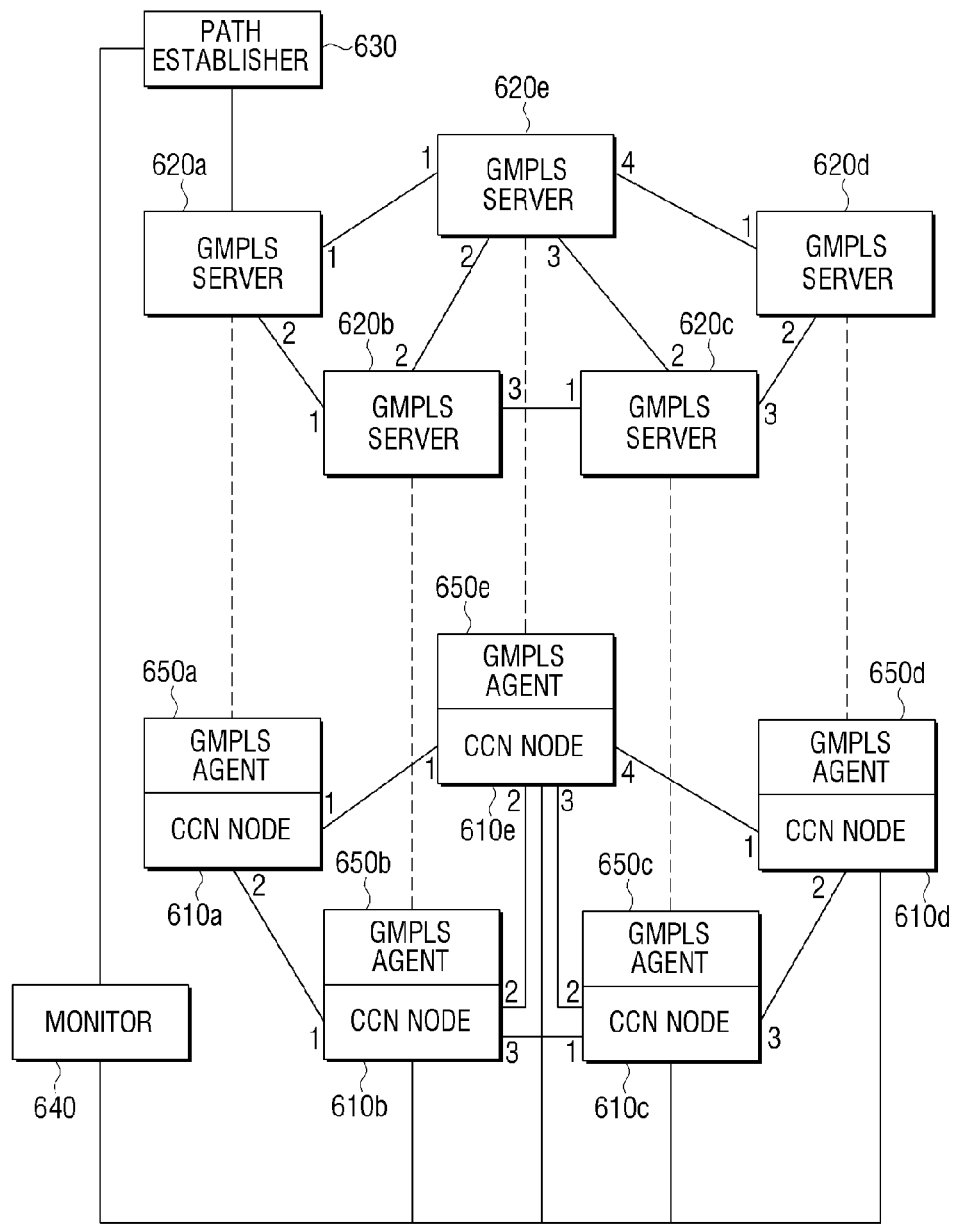
FIGS. 6A and 6B are diagrams illustrating a method of automatically updating the FIB of a CCN node according to an exemplary embodiment of the present general inventive concept.
Figure 6B:
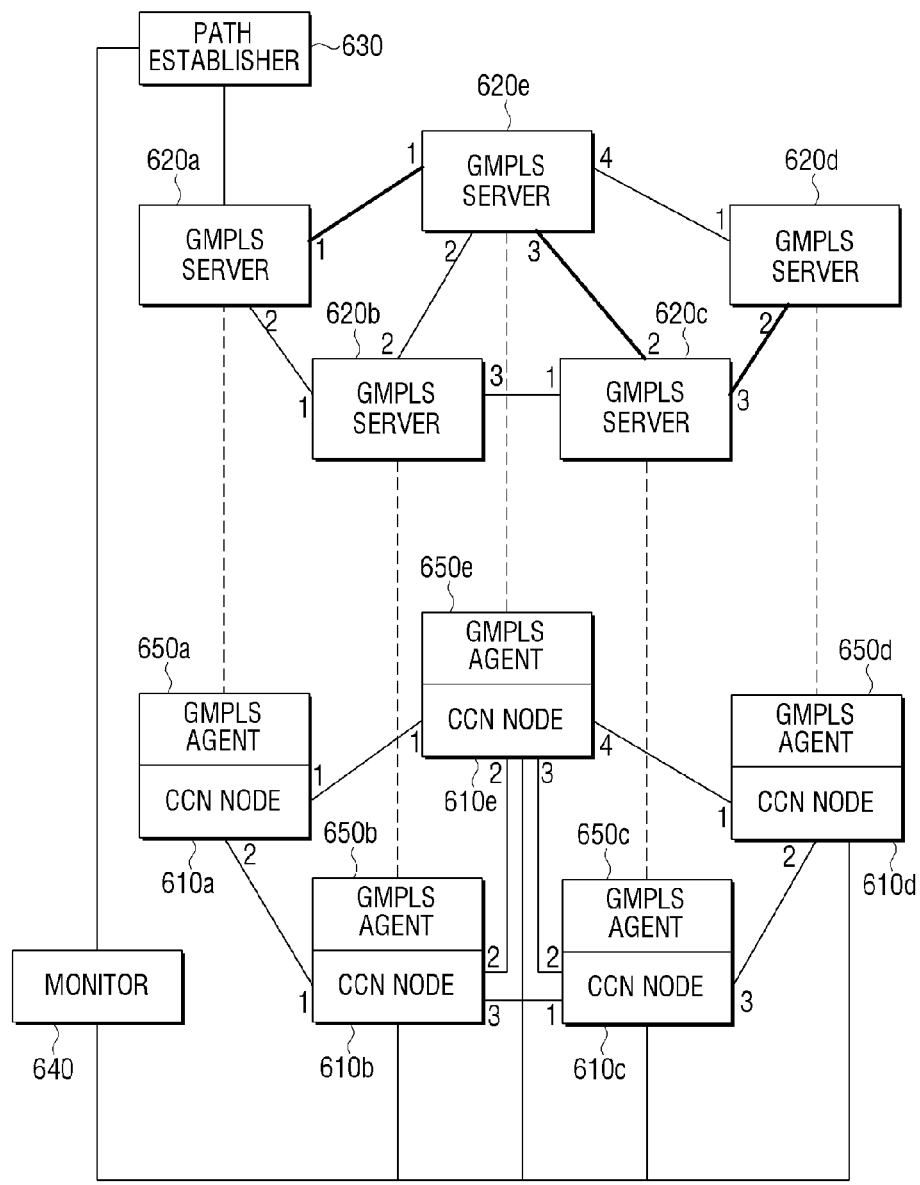

FIGS. 6A and 6B are diagrams illustrating the method of automatically updating a FIB 124 of a CCN node 610 according to an exemplary embodiment of the present general inventive concept.

Referring to FIG. 6A, a network system 200 according to an exemplary embodiment of the present general inventive concept includes a plurality of CCN nodes (610a to 610e), a plurality of GMPLS servers 620a to 620e, a path establisher 630, a monitor 640, and a plurality of GMPLS agents 650a to 650e.

The plurality of CCN nodes 610a to 610e are nodes constituting a CCN. Each CCN node 610a to 610e includes a plurality of communication ports to transmit or receive packets with neighbor CCN nodes 610, a CS 122 to store contents, a PIT 123 being used to transmit contents, and the FIB 124 being used to transmit the interest packet, as described above. In FIG. 6A, the communication ports of each CCN node 610 and each GMPLS server 620 are denoted with numbers 1, 2, 3, and 4. It will be understood that these communication ports may be identical to communication ports 111, 112, etc. illustrated in FIG. 3, with relation to the CCN nodes 610.

Specifically, contents identifiers and identifiers of the communication ports 1 to 4 are matched and stored in the PIT 123. When a data packet of contents is received, CCN node 610 searches an identifier of the contents the same as that of "contents" included in the data packet of contents in the PIT 123, selects a communication port matched with the searched identifier of the contents, and outputs the data packet of contents through the selected communication port.

Further, contents identifiers and identifiers of the communication ports 1 to 4 are also matched and stored in the FIB 124. When the interest packet is received, CCN node 610 searches an identifier of the contents same as that of the contents included in the interest packet in the FIB 124, selects a communication port matched with the searched identifier of the contents, and outputs the interest packet through the selected communication port.

Thus, when the interest packet including an identifier of certain contents which are not stored in the CS 122 is received, a plurality of CCN nodes 610a to 610e respectively select the communication ports to output the interest packet by using the FIB 124. When the data packet including the specific content which is not stored in the CS 122 is received, each of the plurality of CCN nodes 610a to 610e respectively select the communication ports to output the data packet of the contents by using the PIT 123 while storing certain contents in the CS 122.

A plurality of GMPLS servers 620a to 620e perform a function as a controlling plane on a GMPLS (generalized multi-protocol label switching) network. GMPLS indicates a method of uniting, extending and generalizing DWDM (dense wavelength division multiplexing) to increase transmitting amount and MPLS (multi-protocol label switching) to simplify transmitting processes, which are conventional methods to increase transmitting speed of data. GMPLS is not the IP packet method, but a communication method of analyzing a transmitting unit of a heterogeneous transmission network such as an optical wavelength division network (wavelength division multiplexing) and a TDM network to be generalized label, extending and generalizing a GMPLS controlling plane to include various switching and forwarding technology. GMPLS controls transmission traffic by GMPLS protocol, such as RSVP-TE.

Each of the plurality of GMPLS servers 620a to 620e performing the controlling plane function on the GMPLS network includes a plurality of communication ports 1 to 4, and at least one data transmission path may be established between a plurality of GMPLS servers 620*a* to 620*e*.

The path establisher 630 receives information through the plurality of GMPLS servers 620*a* to 620*e* and the monitor 640, and establishes at least one or more data transmission paths between the plurality of GMPLS servers 620*a* to 620*e*.

The monitor 640 obtains information related with one or more of the plurality of CCN nodes 610*a*-610*e* by monitoring the plurality of CCN nodes 610*a* to 610*e*, and transmits the obtained information related with one or more of the plurality of CCN nodes 610*a*-610*e* to the path establisher 630.

According to an exemplary embodiment of the present general inventive concept, the path establisher 630 may establish at least one or more data transmission paths by using network situation information received from a plurality of GMPLS servers 620*a* to 620*e*. Herein, the network situation information may include the available bandwidth regarding a plurality of communication links within the GMPLS network defined by the GMPLS servers 620*a* to 620*e*. Thus, the path establisher 630 may establish at least one or more data transmission paths so as to be suitable for network situation which changes as time goes.

Further, according to an exemplary embodiment of the present general inventive concept, the path establisher 630 may establish at least one or more data transmission paths by further using information regarding a plurality of CCN nodes 610*a* to 610*e* received from the monitor 640. In this case, the information regarding a plurality of CCN nodes 610*a* to 610*e* may include information regarding contents stored in the CS 122 (e.g., identifier information of contents stored in the CS 122 and information regarding the number of transmitting the stored contents to another CCN node 610), information regarding the contents identifiers and the communication port identifiers matched and stored in the PIT 123, and information regarding the contents identifiers and the communication port identifiers matched and stored in the FIB 124.

Meanwhile, a plurality of CCN nodes 610*a* to 610*e* and a plurality of GMPLS servers 620*a* to 620*e* are respectively corresponded with each other as illustrated in FIG. 6. Thus, one CCN node 610 connects one GMPLS server 620. A plurality of communication ports included in the first CCN node 610*a* among a plurality of CCN nodes 620*a* to 620*e* are respectively corresponded with a plurality of communication ports included in the first GMPLS server 620*a* corresponding to the first CCN node 610*a*.

Such connection between CCN node 610 and GMPLS server 620 is performed by GMPLS agent 650. Thus, CCN and GMPLS network define transmission paths of data and packet according to different methods with each other, and GMPLS agent 650 connects and manages both transmission paths of the networks.

According to an exemplary embodiment of the present general inventive concept, at least one or more identifiers of contents stored in the FIB 124 are respectively corresponded with at least one or more data transmission paths established between a plurality of GMPLS servers 620*a* to 620*e*, and a plurality of GMPLS agents 650*a* to 650*e* may respectively update the FIB 124 by using at least one or more data transmission paths established between a plurality of GMPLS servers 620*a* to 620*e*.

More specifically, the first CCN node 610*a* and the first GMPLS server 620*a* are respectively corresponded with each other, and the first GMPLS agent 650*a* connects the first CCN node 610*a* and the first GMPLS server 620*a*. When the first data transmission path corresponds to an identifier of a first contents stored in the FIB 124, the first GMPLS agent 650*a* may update an identifier of a communication port for the first CCN node 610*a* corresponding to a communication port to output the data packet of contents to be identifier of a communication port matched with an identifier of the first contents within the FIB 124.

For example, as described in FIG. 6B, when the first data transmission path is established between GMPLS servers 620 according to thick lines, the fifth GMPLS server 620*e* outputs the contents data through its third communication port 3 after receiving the data through its first communication port 1 from the first GMPLS server 620*a*. As part of this process, the fifth GMPLS server 620*e* transmits information regarding the third communication port 3 in which the data is outputted according to the first data transmission path to the fifth GMPLS agent 650*e*. The fifth GMPLS agent 650*e* in turn updates a communication port matched with the first contents corresponding to the first data transmission path (i.e., a communication port to transmit the interest packet of the first contents) as "third communication port" within the FIB 124 of the fifth CCN node 610*e*. Therefore, when the fifth CCN node 610*e* receives the interest packet of the first contents, the fifth CCN node 610*e* transmits the received interest packet to the third CCN node 610*c* through the third communication port 3.

Figure 7:
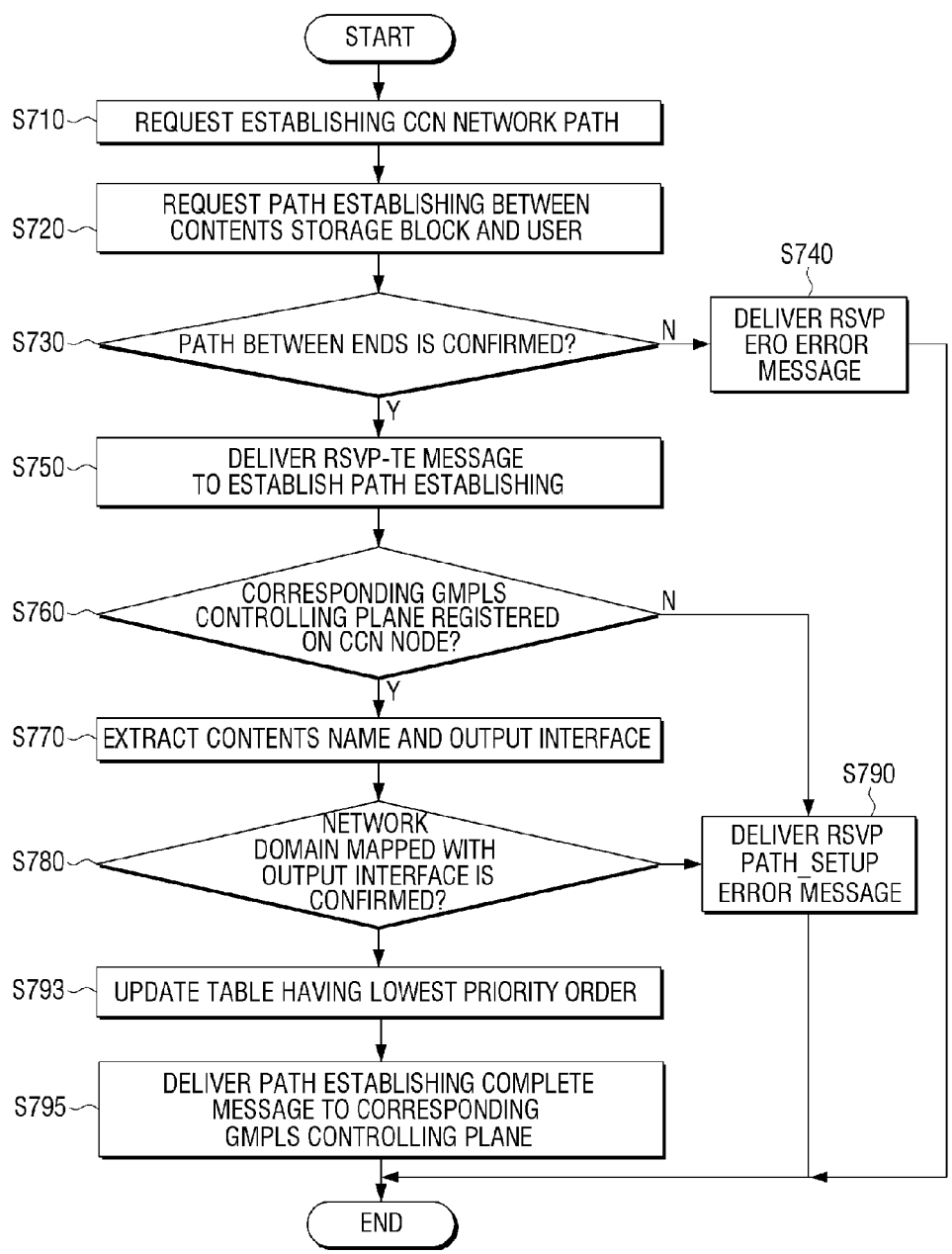
FIG. 7 is a flowchart illustrating a process of automatically updating the FIB of a CCN node according to an exemplary embodiment of the present general inventive concept.

FIG. 7 is a flowchart illustrating a method of automatically updating the FIB 124 of CCN node 610 according to an exemplary embodiment of the present general inventive concept.

First, it is requested that a CCN network path is established in order to update the FIB 124 at operation S710. Further, it is requested that a path between an optimized contents storage block and a user is established according to path establishing block of GMPLS at operation S720. It is determined whether a path between the ends (i.e., the contents storage block and the user) is confirmed or not at operation S730. When the path between the ends is not confirmed at operation S730-N, an RSVP ERO error message is delivered, and the method ends. However, when the path between ends is confirmed at operation S730-Y, a Resource Reservation Protocol with Traffic Engineering extensions (RSVP-TE) message to establish the path between ends is delivered at operation S750. Further, it is determined whether a corresponding GMPLS controlling plane is registered at CCN node 610 or not at operation S760. When a GMPLS controlling plane is registered at CCN node 610 at operation S760-Y, a contents name and output interface (i.e., communication port) are extracted at operation S770. Further, it is determined whether a network domain mapped with the output interface is confirmed or not at operation S780. When a network domain mapped with the output interface is confirmed at operation S780-Y, a table having a lowest priority order is updated at operation S793. Further, a message to inform that path establishing is complete is delivered to the corresponding GMPLS controlling plane at operation S795. However, when the corresponding GMPLS controlling plane is not registered at CCN node 610 at operation S760-N, or when a network domain mapped with the output interface is not confirmed at operation S780-N, an RSVP PATH_SETUP error message is delivered at operation S790, and the method ends.

As described above, when the packet (i.e., the interest packet) is established on the CCN by using establishing of data transmission paths on the GMPLS network, the dynamic CCN may be provided through establishing a routing path based on GMPLS, signaling and interlocking with the CCN node 610. Therefore, calculating an optimized path and signaling to establish the path can be provided by using GMPLS, and path establishing signaling of GMPLS and interlocking with the CCN node 610 are provided. Thus, the dynamic FIB 124 managing of contents based network can be provided. Therefore, dynamic contents based network management can be provided according to network situation. Further, various services may be provided on future contents based networks by providing a framework in which a path can be established according to QoS (quality of service) parameters that are not determined on the contents based network.

A further advantage is that that developing new path calculating algorithms can be advanced according to request of QoS on future contents based networks by dividing the controlling plane and the data plane and using path calculating blocks of the controlling plane. Further, the data plane provides a function of the contents based network fully, and thus, division between the controlling plane and the data plane can be perfectly performed on the contents based network.

Figure 8:
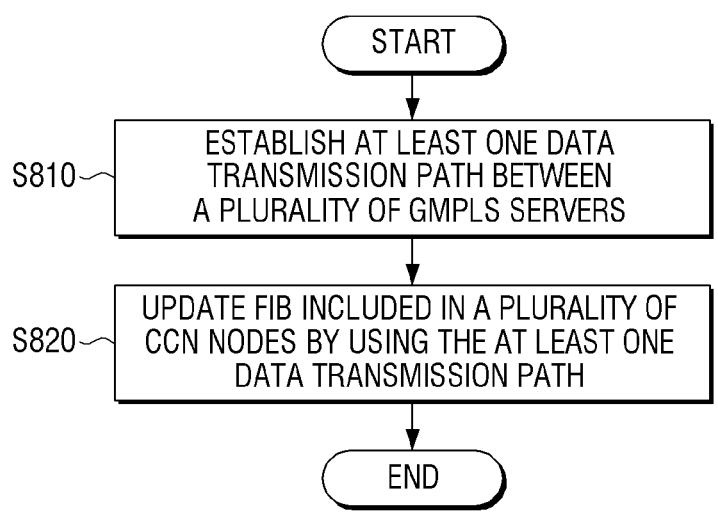
FIG. 8 is a flowchart illustrating a method of establishing paths to transmit the interest packet on a CCN by using a GMPLS network according to an exemplary embodiment of the present general inventive concept.

FIG. 8 is a flowchart illustrating a method of establishing packet transmission paths on the contents based network by using GMPLS network according to an exemplary embodiment of the present general inventive concept. The method illustrated in FIG. 8 may be used to establish packet transmission paths on the contents based network in the network system illustrated in FIG. 6A.

First, the path establisher 630 establishes at least one or more data transmission paths between a plurality of GMPLS servers 620*a* to 620*e* by using available bandwidth regarding a plurality of communication links within GMPLS network defined by the two different GMPLS servers with each other at operation S810.

Further, a plurality of GMPLS agents 650*a* to 650*e* respectively update the FIB 124 included in a plurality of CCN nodes 610*a* to 610*e* by using the at least one or more data transmission paths, and establish interest packet transmission paths on the contents based network at operation S820.

Thereby, the FIB 124 of CCN node 610 of the contents based network can be automatically managed.

Meanwhile, the communication method of the terminal apparatus according to the above various exemplary embodiments of the present general inventive concept may be implemented to be programs and provided to the display apparatus. The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A communication method of a terminal apparatus included in a contents centric network (CCN), the method comprising:
   receiving an interest packet regarding a specific content from an external terminal apparatus;
   adjusting a window size of the interest packet based on at least one of a requesting frequency of the specific content corresponding to the interest packet and a communication status; and
   after adjusting the window size, transmitting the interest packet to surrounding terminal apparatuses,
   wherein the receiving of the interest packet comprises:
      determining whether the specific content corresponding to the interest packet has been previously requested or not; and
      adding the specific content to a request counter list when the specific content corresponding to the interest packet not having been previously requested, and increasing a counter value of the specific content included in the request counter list by a predetermined ratio when the specific content corresponding to the interest packet has been previously requested, and
   wherein adjusting the window size comprises increasing the window size to forward the interest packet as the requesting frequency of the specific content corresponding to the interest packet increases.

2. The communication method of claim 1,
   wherein adjusting the window size comprises:
   determining the requesting frequency of the specific content based on the counter value included in the request counter list and a number of communication ports receiving the interest packet regarding the specific content stored in a pending interest table.

3. The communication method of claim 1, wherein adjusting the window size comprises:
   determining the communication status by receiving information from an external network monitor regarding a bandwidth of a communication port to transmit the interest packet.

4. The communication method of claim 1, further comprising:
   when the requesting frequency of the specific content corresponding to the interest packet is more than a preset value, requesting at least one or more segments consecutively requested after a segment of the content corresponding to the interest packet.

5. The communication method of claim 1, wherein:
   the terminal apparatus comprises:
      a contents store to store contents,
      a pending interest table to store information of a communication port requested for the contents, and
      a forwarding information base to store information regarding a communication port to forward the interest packet, and
   the communication method further comprises:
      determining whether the specific content is stored in the contents store or not, when the interest packet regarding the specific content is received; and transmitting the specific content stored in the contents store to the external terminal apparatus, when the specific content is stored in the contents store.

6. The communication method of claim 5, further comprising:
determining whether a request for the specific content is stored in the pending interest table or not, when the specific content is not stored in the contents store; and
updating a communication port regarding the specific content stored in the pending interest table, when the request for the specific content is stored in the pending interest table.

7. The communication method of claim 6, further comprising:
when the request for the specific content is not stored in the pending interest table, determining whether forwarding information regarding the specific content is stored in the forwarding information base in order to forward the interest packet,
wherein transmitting the interest packet comprises:
transmitting the interest packet based on the forwarding information when forwarding information of the specific content is stored in the forwarding information base, and
transmitting the interest packet based on default forwarding information when forwarding information of the specific content is not stored in the forwarding information base.

8. A terminal apparatus included in a contents centric network, the terminal apparatus comprising:
a communicator to perform communication with an external device;
a controller to control the communicator to adjust a window size of an interest packet regarding a specific content based on at least one of a requesting frequency of the specific content corresponding to the interest packet and a communication status when the interest packet is received from an external terminal apparatus through the communicator, and to control the communicator to transmit the interest packet to surrounding terminal apparatuses after adjusting the window size; and
a storage unit to store a request counter list,
wherein the controller controls the storage unit to determine whether the specific content corresponding to the interest packet has been previously requested or not when the interest packet is received, to add the specific content to the request counter list when the specific content corresponding to the interest packet was not previously requested, and to increase a counter value of the specific content included in the request counter list by a predetermined ratio when the specific content corresponding to the interest packet has been previously requested, and
wherein the controller increases the window size to forward the interest packet as the requesting frequency of the specific content corresponding to the interest packet increases.

9. The terminal apparatus of claim 8, wherein the controller determines the requesting frequency of the specific content based the counter value included in the request counter list and a number of communication ports receiving the interest packet regarding the specific content of a pending interest table stored in the storage unit.

10. The terminal apparatus of claim 8, wherein the controller determines the communication status by receiving information from an external network monitor regarding a bandwidth of a communication port to transmit the interest packet.

11. The terminal apparatus of claim 8, wherein the controller controls the communicator to request at least one or more segments consecutively requested after a segment of the content corresponding to the interest packet, when the requesting frequency of the specific content corresponding to the interest packet is more than a preset value.

12. The terminal apparatus of claim 8, further comprising:
a pending interest table to store information of a communication port requested for contents; and
a forwarding information base to store information regarding a communication port to forward the interest packet,
wherein, when the interest packet regarding the specific content is received, the controller controls the communicator to determine whether the specific content is stored in the contents store, and to transmit the specific content stored in the contents store to the external terminal apparatus, when the specific content is stored in the contents store.

13. The terminal apparatus of claim 12, wherein, when the specific content is not stored in the contents store, the controller determines whether a request for the specific content is stored in the pending interest table, and updates a communication port regarding the specific content stored in the pending interest table, when the request for the specific content is stored in the pending interest table.

14. The terminal apparatus of claim 13, wherein the controller controls the communicator to determine whether forwarding information regarding the specific content is stored in the forwarding information base in order to forward the interest packet, when the request for the specific content is not stored in the pending interest table, to transmit the interest packet based on the forwarding information when forwarding information regarding the specific content is stored in the forwarding information base, and to transmit the interest packet based on default forwarding information when forwarding information regarding the specific content is not stored in the forwarding information base.

15. A non-transitory computer-readable recording medium to contain computer-readable codes as a program to execute the communication method of claim 1.

16. A contents centric network (CCN), comprising:
a plurality of terminal apparatuses, each terminal apparatus comprising:
a communicator to perform communication with an external device,
a storage unit to store a requesting frequency of a specific content;
a controller to increment the requesting frequency when an interest packet regarding the specific content is received at the communicator, to control the communicator to adjust a window size of the interest packet based on at least one of the requesting frequency and a communication status of the CCN, and to control the communicator to transmit the interest packet to surrounding terminal apparatuses in the CCN after adjusting the window size,
a storage unit to store a request counter list,
wherein the controller controls the storage unit to determine whether the specific content corresponding to the interest packet has been previously requested or not when the interest packet is received, to add the specific content to the request counter list when the specific content corresponding to the interest packet has not been previously requested, and to increase a counter value of the specific content included in the request counter list by a predetermined ratio when the specific content corresponding to the interest packet has been previously requested, and wherein the controller increases the window size to forward the interest packet as the requesting frequency of the specific content corresponding to the interest packet increases.

17. The CCN of claim 16, further comprising a plurality of servers corresponding to the plurality of terminal apparatuses, the plurality of servers forming a controlling plane of a Generalized Multi-Protocol Label Switching (GMPLS) network.

18. The CCN of claim 17, further comprising:

a path establisher to receive network situation information from the plurality of servers, and to establish one or more data transmission paths between the plurality of servers to transmit the interest packet, the paths being established based on the network situation information.

19. The CCN of claim 18, wherein the network situation information comprises available bandwidth regarding a plurality of communication links within the Generalized Multi-Protocol Label Switching (GMPLS) network.

20. A communication method of a contents centric network (CCN), the method comprising:

receiving an interest packet regarding a specific content at a first terminal apparatus included in the CCN;

incrementing a requesting frequency of the specific content;

adjusting a window size of the interest packet based on at least one of the requesting frequency and a communication status of the CCN; and after adjusting the window size, transmitting the interest packet to terminal apparatuses surrounding the first terminal apparatus in the CCN wherein the receiving of the interest packet comprises:
    determining whether the specific content corresponding to the interest packet has been previously requested or not; and
    adding the specific content to a request counter list when the specific content corresponding to the interest packet not having been previously requested, and increasing a counter value of the specific content included in the request counter list by a predetermined ratio when the specific content corresponding to the interest packet has been previously requested, and wherein adjusting the window size comprises increasing the window size to forward the interest packet as the requesting frequency of the specific content corresponding to the interest packet increases.

* * * * *